(12) United States Patent
Katagiri

(10) Patent No.: US 10,913,830 B2
(45) Date of Patent: Feb. 9, 2021

(54) RUBBER-REINFORCING CORD AND RUBBER PRODUCT INCLUDING SAME

(71) Applicant: Nippon Sheet Glass Company, Limited, Tokyo (JP)

(72) Inventor: Shinya Katagiri, Aichi (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 134 days.

(21) Appl. No.: 15/579,822

(22) PCT Filed: Jul. 13, 2016

(86) PCT No.: PCT/JP2016/003308
§ 371 (c)(1),
(2) Date: Dec. 5, 2017

(87) PCT Pub. No.: WO2017/010098
PCT Pub. Date: Jan. 19, 2017

(65) Prior Publication Data
US 2018/0355129 A1  Dec. 13, 2018

(30) Foreign Application Priority Data
Jul. 15, 2015 (JP) ................................ 2015-141403

(51) Int. Cl.
*C08J 5/06* (2006.01)
*D06M 13/395* (2006.01)
(Continued)

(52) U.S. Cl.
CPC .................. *C08J 5/06* (2013.01); *C03C 25/50* (2013.01); *C08L 9/02* (2013.01); *D02G 3/44* (2013.01);
(Continued)

(58) Field of Classification Search
CPC ... C08J 5/06; C03C 25/50; C08L 9/02; D02G 3/44; D06M 13/352; D06M 13/395; D06M 13/418; D06M 15/693
(Continued)

(56) References Cited

U.S. PATENT DOCUMENTS 4,826,721 A  5/1989 Obrecht et al.
2001/0055667 A1  12/2001 Kinoshita et al.
(Continued)

FOREIGN PATENT DOCUMENTS

EP  2014824 A1  1/2009
JP  S62292430 A  12/1987
(Continued)

OTHER PUBLICATIONS

Extended European Search Report issued for European Patent Application No. 16824082.8, dated Feb. 14, 2019, 10 pages.
(Continued)

*Primary Examiner* — Vincent Tatesure
(74) *Attorney, Agent, or Firm* — Hamre, Schumann, Mueller & Larson, P.C.

(57) ABSTRACT

A rubber-reinforcing cord (30) according to the present invention includes: a reinforcing fiber or reinforcing fiber bundle (21); a first coating (22) provided to cover the reinforcing fiber or reinforcing fiber bundle (21); and a second coating (31) provided to cover the first coating (22) and be located at the outer surface of the rubber-reinforcing cord (30). The first coating (22) includes: first rubber including nitrile-based rubber as a main component; and a first crosslinking agent. The second coating (31) is a coating different from the first coating (22) and includes: second rubber consisting essentially of nitrile-based rubber; and a second crosslinking agent. The nitrile-based rubber is at least one selected from nitrile rubber, hydrogenated nitrile
(Continued)

rubber, carboxylated nitrile rubber, and carboxylated hydrogenated nitrile rubber.

8 Claims, 1 Drawing Sheet

(51) Int. Cl.
  *D06M 15/693* (2006.01)
  *D02G 3/44* (2006.01)
  *C03C 25/50* (2006.01)
  *D06M 13/418* (2006.01)
  *C08L 9/02* (2006.01)
  *D06M 13/352* (2006.01)
(52) U.S. Cl.
  CPC ........ *D06M 13/352* (2013.01); *D06M 13/395* (2013.01); *D06M 13/418* (2013.01); *D06M 15/693* (2013.01); *C08J 2309/02* (2013.01); *C08L 2312/00* (2013.01); *D06M 2200/50* (2013.01)
(58) Field of Classification Search
  USPC ......................................................... 428/375
  See application file for complete search history.

(56) References Cited

U.S. PATENT DOCUMENTS

| | | | | |
|---|---|---|---|---|
| 2014/0093729 | A1* | 4/2014 | Furusawa | ................ C08K 3/04 428/367 |
| 2016/0377149 | A1* | 12/2016 | Furusawa | ................ F16G 1/10 474/205 |

FOREIGN PATENT DOCUMENTS

| | | | |
|---|---|---|---|
| JP | H04-126877 A | 4/1992 | |
| JP | H04103634 A | 4/1992 | |
| JP | H09296378 A | 11/1997 | |
| JP | 2004-100113 A | 4/2004 | |
| JP | 2004100059 A | 4/2004 | |
| JP | 2009297894 A | 12/2009 | |
| JP | 2010234605 A | 10/2010 | |
| JP | 2013002002 A | 1/2013 | |
| WO | 2007129624 A1 | 11/2007 | |
| WO | 2015098105 | 7/2015 | |
| WO | WO-2015098105 A1 * | 7/2015 | ............... F16G 1/28 |

OTHER PUBLICATIONS

International Search Report issued for International Patent Application No. PCT/JP2016/003308, dated Sep. 6, 2016, 5 pages including English translation.

* cited by examiner

RUBBER-REINFORCING CORD AND RUBBER PRODUCT INCLUDING SAME

TECHNICAL FIELD

The present invention relates to a rubber-reinforcing cord and a rubber product including the rubber-reinforcing cord.

BACKGROUND ART

A widely used approach for increasing the strength and durability of a rubber product such as a toothed rubber belt is to embed a reinforcing cord including a reinforcing fiber such as a glass fiber or chemical fiber in matrix rubber of the rubber product. The surface of the reinforcing fiber of the reinforcing cord is generally provided with coatings for protecting the reinforcing fiber and for enhancing the adhesion between the matrix rubber and the reinforcing fiber.

It is commonly known that, when the matrix rubber includes hydrogenated nitrile rubber as a main component, a coating containing chlorosulfonated polyethylene (hereinafter referred to as "CSM") as a main component is suitably used as one of the coatings of the rubber-reinforcing cord that is provided at the outermost side (outer surface) of the rubber-reinforcing cord and is therefore to be in contact with the matrix rubber (see Patent Literature 1, for example).

CITATION LIST

Patent Literature

Patent Literature 1: WO 2007/129624 A1

SUMMARY OF INVENTION

Technical Problem

However, if a rubber-reinforcing cord having a CSM-containing coating located to be in contact with matrix rubber of rubber products is employed in a rubber product used in an environment involving exposure to an oil such as in the oil, the protection of the reinforcing fiber by the coating will be insufficient, and the adhesion between the matrix rubber and the rubber-reinforcing cord will also be insufficient. Specifically, CSM is susceptible to oils, and oil particles can so easily become trapped within and between the molecules of CSM that exposure of the CSM-containing coating to an oil causes swelling of the coating. The swelling results in separation of the coating from both the reinforcing fiber and the matrix rubber, leading to insufficient protection of the reinforcing fiber by the coating and insufficient adhesion between the matrix rubber and the reinforcing fiber.

It is therefore an object of the present invention to provide a rubber-reinforcing cord capable of ensuring satisfactory protection of a reinforcing fiber by a coating and achieving strong adhesion to matrix rubber even when employed, for example, in a rubber product whose matrix rubber includes hydrogenated nitrile rubber and that is used in an environment involving exposure to an oil. Another object of the present invention is to provide a rubber product reinforced by such a rubber-reinforcing cord and capable of maintaining high strength over a long period of time.

Solution to Problem

The present invention provides a rubber-reinforcing cord for reinforcing a rubber product, the rubber-reinforcing cord including:

a reinforcing fiber or a reinforcing fiber bundle;

a first coating provided to cover the reinforcing fiber or the reinforcing fiber bundle; and a second coating provided to cover the first coating and be located at an outer surface of the rubber-reinforcing cord, wherein the first coating includes: first rubber including nitrile-based rubber as a main component; and a first crosslinking agent, the second coating is a coating different from the first coating and includes: second rubber consisting essentially of nitrile-based rubber; and a second crosslinking agent, and the nitrile-based rubber is at least one selected from nitrile rubber, hydrogenated nitrile rubber, carboxylated nitrile rubber, and carboxylated hydrogenated nitrile rubber.

The present invention also provides a rubber product reinforced by the above rubber-reinforcing cord according to the present invention.

Advantageous Effects of Invention

Even when employed in a rubber product whose matrix rubber includes hydrogenated nitrile rubber and that is used in an environment involving exposure to an oil, the rubber-reinforcing cord according to the present invention is capable of ensuring satisfactory protection of the reinforcing fiber by the coatings and achieving strong adhesion to the matrix rubber. The rubber product according to the present invention, being reinforced by such a rubber-reinforcing cord, can maintain high strength over a long period of time even when used in an environment involving exposure to an oil.

DESCRIPTION OF EMBODIMENTS

Figure 1:
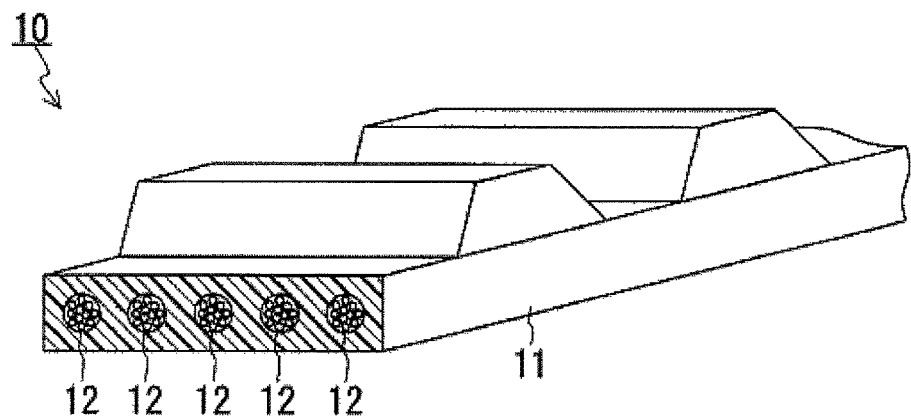
FIG. 1 is a partial exploded perspective view schematically showing an example of the rubber product according to the present invention.

Hereinafter, an embodiment of the present invention will be described.

[Rubber-Reinforcing Cord]

A rubber-reinforcing cord according to the present embodiment is a cord for reinforcing rubber products. This rubber-reinforcing cord includes: a reinforcing fiber or a reinforcing fiber bundle composed of reinforcing fibers bundled together; a first coating provided to cover the reinforcing fiber or the reinforcing fiber bundle; and a second coating provided to cover the first coating and be located at an outer surface of the rubber-reinforcing cord. The first coating includes: first rubber including nitrile-based rubber as a main component; and a first crosslinking agent. The second coating is a coating different from the first coating and includes: second rubber consisting essentially of nitrile-based rubber; and a second crosslinking agent. The nitrile-based rubber as described herein is at least one selected from nitrile rubber (NBR), hydrogenated nitrile rubber (HNBR), carboxylated nitrile rubber (X-NBR), and carboxylated hydrogenated nitrile rubber (X-HNBR).

Hereinafter, a method for producing the reinforcing cord according to the present embodiment will be described in detail.

(Reinforcing Fiber and Reinforcing Fiber Bundle)

The reinforcing fiber included in the rubber-reinforcing cord according to the present embodiment may be any fiber capable of enhancing the shape stability and strength of rubber products, and the material and shape of the fiber are not particularly limited.

Examples of fibers that can be used as the reinforcing fiber include: a glass fiber; a polyvinyl alcohol fiber typified by a vinylon fiber; a polyester fiber; a polyamide fiber such as nylon and aramid (aromatic polyamide); a polyarylate fiber; a polyketone fiber; a carbon fiber; and a poly(p-phenylene benzoxazole) (PBO) fiber. Among these, a glass fiber is suitably used since it is superior in various properties such as dimensional stability, heat resistance, and tensile strength. For example, when a rubber-reinforcing cord for reinforcing a rubber product that needs to have high durability is fabricated, it is preferable to use a glass fiber with adequate strength.

The type of the glass of the glass fiber is not particularly limited. High-strength glass, which has high tensile strength, is more preferred than common alkali-free glass.

The structure of the reinforcing fiber is not particularly limited. For example, when the fiber is a glass fiber, it is preferable that filaments contained as the smallest structural components of the fiber have an average diameter of 5 to 13 μm. For example, 50 to 2000 such filaments are formed into a bundle with the aid of a sizing agent, and one bundle thus formed is used as a reinforcing fiber or a plurality of such bundles are aligned into a reinforcing fiber. A plurality of such reinforcing fibers are aligned into a reinforcing fiber bundle.

The reinforcing fiber bundle may be formed, for example, by primarily twisting the above reinforcing fiber, aligning a plurality of such twisted reinforcing fibers, and finally twisting the plurality of fibers in a direction opposite to the direction of the primary twisting.

The method for forming the reinforcing fiber bundle is not limited to that described above and, for example, the following various types of reinforcing fiber bundles can be employed: a reinforcing fiber bundle formed without the final twisting; a reinforcing fiber bundle formed by performing the primary and final twisting in the same direction; a reinforcing fiber bundle the central and peripheral portions of which are constituted by different fibers made of different materials; and a reinforcing fiber bundle in which the directions of the primary and final twisting vary. A reinforcing fiber bundle thus formed by twisting is suitable for use in a product, such as a reinforcing cord for a toothed belt, which needs to have bending resistance.

As described above, a reinforcing fiber bundle is formed by bundling a plurality of reinforcing fibers together. Reinforcing fibers whose surface is coated with an undercoat layer may be prepared beforehand, and these reinforcing fibers may be used to form a reinforcing fiber bundle.

(First Coating)

The first coating includes: first rubber including nitrile-based rubber as a main component; and a first crosslinking agent. The first rubber as described herein refers to the total rubber component contained in the first coating. Saying that the first coating includes first rubber including nitrile-based rubber as a main component therefore means that the nitrile-based rubber is contained in such an amount as to account for a major proportion of the total rubber component contained in the first coating. Saying that the first rubber includes a nitrile-based rubber as a main component means that the content of the nitrile-based rubber is 50 mass % or more with respect to the total rubber component contained in the first coating.

Nitrile-based rubber hardly absorbs oils and has high oil resistance. The fact that the first coating includes the first rubber including such nitrile-based rubber as a main component enables the first coating, even when the rubber-reinforcing cord according to the present embodiment is employed in a rubber product used in an environment involving contact with an oil, to maintain satisfactory protection of the reinforcing fiber or the reinforcing fiber bundle over a long period of time. To improve the function of the first coating as a protective layer, the first rubber preferably contains 60 mass % or more of nitrile-based rubber and more preferably consists essentially of nitrile-based rubber. Saying that the first rubber consists essentially of nitrile-based rubber means that the content of the nitrile-based rubber in the first rubber is 80 mass % or more, preferably 90 mass % or more, and more preferably 95 mass % or more. The first rubber may consist of nitrile-based rubber.

The first rubber preferably includes HNBR as a main component. Saying that the first rubber includes HNBR as a main component means that the content of HNBR in the first rubber is 50 mass % or more. The first rubber more preferably contains 60 mass % or more of HNBR and even more preferably consists essentially of HNBR. Saying that the first rubber consists essentially of HNBR means that the content of HNBR in the first rubber is 80 mass % or more, preferably 90 mass % or more, and more preferably 95 mass % or more. The first rubber may consist of HNBR.

The first coating includes the first crosslinking agent. This first crosslinking agent can cause the first rubber to be crosslinked in the first coating. In consequence, the reinforcing fibers or the reinforcing fiber bundles strongly adhere to each other via the first coating, and the strength of the first coating itself is enhanced by the chemical bond. This further improves the protective function of the first coating for the reinforcing fiber or reinforcing fiber bundle. When the second coating is provided in contact with the first coating, the crosslinking strengthens the adhesion at the interface between the first coating and the second coating, thus leading to excellent protective function of the first coating and second coating for the reinforcing fiber or reinforcing fiber bundle and high adhesion strength between the rubber-reinforcing cord and matrix rubber.

Examples of the first crosslinking agent include: quinone dioxime crosslinking agents such as p-quinone dioxime; methacrylate crosslinking agents such as lauryl methacrylate and methyl methacrylate; allyl crosslinking agents such as DAF (diallyl fumarate), DAP (diallyl phthalate), TAC (triallyl cyanurate), and TAIL (triallylisocyanurate); maleimide crosslinking agents such as bismaleimide, phenylmaleimide, and N,N'-m-phenylenedimaleimide; isocyanate compounds such as aromatic or aliphatic organic diisocyanates, polyisocyanate, blocked isocyanate, and blocked polyisocyanate; aromatic nitroso compounds; sulfur; and peroxides. These crosslinking agents may be used alone, or a plurality thereof may be used in combination. The first crosslinking agent may be at least one selected from the group consisting of the maleimide crosslinking agents and the isocyanate compounds. The maleimide crosslinking agents or the isocyanate compounds, when used in combination with a rubber latex, can specifically enhance the adhesion between the first coating and another coating in contact with the first coating (the adhesion between the first coating and the second coating in the case where the second coating is provided in contact with the first coating).

When the first crosslinking agent includes a maleimide crosslinking agent, the content of the maleimide crosslinking agent in the first coating is, for example, 10 to 50 parts by mass, preferably 20 to 40 parts by mass, more preferably 25 to 35 parts by mass, and particularly preferably 27 to 33 parts by mass, with respect to 100 parts by mass of the first rubber.

Examples of preferred combinations of the first rubber and the first crosslinking agent in the first coating include a combination of the first rubber including HNBR and the first crosslinking agent including a maleimide crosslinking agent.

The total content of the first rubber and the first crosslinking agent in the first coating is, for example, 50 mass % or more. The first coating can be formed, for example, from a first water-based treatment agent including the first rubber and the first crosslinking agent as main components. The term "main components" is intended to mean that the total proportion of the components in the constituting components (excluding the solvent) of the first water-based treatment agent is 50 mass % or more.

The first coating may further include a filler. The filler may be an organic filler or an inorganic filler. Examples of the filler include carbon black and silica. The addition of the filler can reduce the production cost of the rubber-reinforcing cord and can also effectively enhance the adhesion between the first coating and another coating in contact with the first coating (the adhesion between the first coating and the second coating in the case where the second coating is provided in contact with the first coating). In particular, carbon black is suitably used since it can increase the cohesion of the treatment agent. To increase the adhesiveness or improve the stability, the first coating may include additives such as a plasticizer, anti-aging agent, metal oxide, and crosslinking aid.

The thickness of the first coating and the proportion of the first coating in the whole rubber-reinforcing cord are not particularly limited, and may be adjusted appropriately depending on the properties required of the rubber-reinforcing cord or the type of the reinforcing fiber. In an example, the proportion of the first coating in the whole rubber-reinforcing cord is in the range of 5 to 30 mass %, preferably in the range of 10 to 25 mass %, and more preferably in the range of 13 to 19 mass %.

The first coating only has to be provided to cover the reinforcing fiber or the reinforcing fiber bundle. The first coating may be provided in contact with the reinforcing fiber or the reinforcing fiber bundle. Alternatively, another coating such as an undercoat layer may be provided on the reinforcing fiber or the reinforcing fiber bundle, and the first coating may be provided to cover the reinforcing fiber or the reinforcing fiber bundle with the undercoat layer interposed therebetween.

(Second Coating)

The second coating includes: second rubber consisting essentially of nitrile-based rubber; and a second crosslinking agent. The second rubber as described herein refers to the total rubber component contained in the second coating. Saying that the second coating includes second rubber consisting essentially of nitrile-based rubber therefore means that the total rubber component contained in the second coating consists essentially of nitrile-based rubber. Saying that the second rubber consists essentially of nitrile-based rubber means that the proportion of the nitrile-based rubber in the total rubber component contained in the second coating is 80 mass % or more, preferably 90 mass % or more, and more preferably 95 mass % or more. The second rubber may consist of nitrile-based rubber.

As previously described, nitrile-based rubber hardly absorbs oils and has high oil resistance. The fact that the rubber component contained in the second coating provided at the outer surface of the rubber-reinforcing cord consists essentially of nitrile-based rubber therefore enables the second coating, even when the rubber-reinforcing cord according to the present embodiment is employed in a rubber product used in an environment involving contact with an oil, to maintain satisfactory protection of the reinforcing fiber or the reinforcing fiber bundle over a long period of time and achieve strong adhesion to the matrix rubber of the rubber product.

Additionally, since the rubber component contained in the second coating consists essentially of nitrile-based rubber, the formation of the second coating does not require the use of an organic solvent such as xylene for application of a treatment agent for forming the coating, unlike the formation of conventional coatings including CSM as a main component. The second coating thus has the advantage of being able to be formed using a water-based treatment agent.

The second rubber preferably includes HNBR as a main component. Saying that the second rubber includes HNBR as a main component means that the content of HNBR in the second rubber is 50 mass % or more. The second rubber more preferably contains 60 mass % or more of HNBR and more preferably consists essentially of HNBR. Saying that the second rubber consists essentially of HNBR means that the content of HNBR in the second rubber is 80 mass % or more, preferably 90 mass % or more, and more preferably 95 mass % or more. The second rubber may consist of HNBR.

The second coating includes the second crosslinking agent. This second crosslinking agent can cause the second rubber to be crosslinked in the second coating. In consequence, the rubber-reinforcing cord strongly adheres to matrix rubber, and the strength of the second coating itself is enhanced by the chemical bond. When the second coating is provided in contact with the first coating, the crosslinking strengthens the adhesion at the interface between the first coating and the second coating, thus leading to excellent protective function of the first coating and second coating for the reinforcing fiber or reinforcing fiber bundle and high adhesion strength between the rubber-reinforcing cord and matrix rubber.

The crosslinking agents mentioned as examples of the first crosslinking agent can be used as the second crosslinking agent. As is the case with the first crosslinking agent, the crosslinking agents may be used alone, or a plurality thereof may be used in combination. The second crosslinking agent may be at least one selected from the group consisting of maleimide crosslinking agents and isocyanate compounds. The maleimide crosslinking agents or the isocyanate compounds, when used in combination with the second rubber consisting essentially of nitrile-based rubber, can specifically enhance the adhesion between the second coating and the matrix rubber.

When the second crosslinking agent includes a maleimide crosslinking agent, the content of the maleimide crosslinking agent in the second coating is, for example, 10 to 50 parts by mass, preferably 20 to 40 parts by mass, more preferably 25 to 35 parts by mass, and particularly preferably 27 to 33 parts by mass, with respect to 100 parts by mass of the second rubber. When the second crosslinking agent includes an isocyanate compound, the content of the isocyanate compound in the second coating is, for example, 10 to 50 parts by mass, preferably 20 to 40 parts by mass, more preferably 25 to 35 parts by mass, and particularly preferably 27 to 33 parts by mass, with respect to 100 parts by mass of the second rubber. When the second coating contains a maleimide crosslinking agent and/or isocyanate compound as the second crosslinking agent in an amount within the above range, the adhesion strength between the rubber-reinforcing cord and a rubber latex can be further enhanced.

When the second crosslinking agent includes both a maleimide crosslinking agent and an isocyanate compound, the respective contents of the maleimide crosslinking agent and the isocyanate compound are, for example, 10 to 50 parts by mass, preferably 20 to 40 parts by mass, more preferably 25 to 35 parts by mass, and particularly preferably 27 to 33 parts by mass, with respect to 100 parts by mass of the second rubber.

Examples of preferred combinations of the second rubber and the second crosslinking agent in the second coating include a combination of the second rubber including HNBR and the second crosslinking agent including a maleimide crosslinking agent and an isocyanate compound.

The total content of the second rubber and the second crosslinking agent in the second coating is, for example, 50 mass % or more. The second coating can be formed from a second water-based treatment agent including the second rubber and the second crosslinking agent as main components. The term "main components" is intended to mean that the total proportion of the components in the constituting components (excluding the solvent) of the second water-based treatment agent is 50 mass % or more.

The second coating may further include a filler. The filler may be an organic filler or an inorganic filler. Examples of the filler include carbon black and silica. The addition of the filler can reduce the production cost of the rubber-reinforcing cord and can effectively enhance the adhesion between the rubber-reinforcing cord and matrix rubber. In particular, carbon black is suitably used since it can increase the cohesion of the treatment agent. When the second coating includes carbon black, the content of the carbon black in the second coating is, for example, 2 to 20 parts by mass, preferably 5 to 17 parts by mass, and more preferably 7 to 15 parts by mass, with respect to 100 parts by mass of the second rubber.

The total content of the above three components (maleimide crosslinking agent, isocyanate compound, and carbon black) in the second coating is preferably 100 parts by mass or less with respect to 100 parts by mass of the second rubber. Adjusting the total content of the three components to 100 parts by mass or less makes the formation of the coating easy, thus leading to enhancement of the protective function of the coating for the reinforcing fiber or reinforcing fiber bundle and to improvement in the bending fatigue resistance of the rubber-reinforcing cord.

To increase the adhesiveness or improve the stability, the second coating may further include additives such as a plasticizer, anti-aging agent, metal oxide, and crosslinking aid.

The thickness of the second coating and the proportion of the second coating in the whole rubber-reinforcing cord are not particularly limited, and may be adjusted appropriately depending on the properties required of the rubber-reinforcing cord or the type of the reinforcing fiber. In an example, the proportion of the second coating in the whole rubber-reinforcing cord is in the range of 0.5 to 10 mass %, preferably in the range of 1 to 7 mass %, and more preferably in the range of 1.2 to 5 mass %.

The second coating is a coating different from the first coating. The components of the second coating and the ratio between the components of the second coating are therefore not exactly identical to the components of the first coating and the ratio between the components of the first coating. The second coating only has to be provided to be located at the outer surface of the rubber-reinforcing cord; namely, the second coating only has to be provided to be located at the outermost side of the rubber-reinforcing cord so that the surface of the second coating is exposed to the outside and that the second coating covers the first coating. This means that the second coating need not be in contact with the first coating. For example, another coating may be provided between the first coating and the second coating, and the second coating may cover the first coating with the other coating interposed therebetween. However, the provision of the second coating in contact with the first coating leads to strong bonding between the coatings and hence to increased overall strength of the coatings, since both the first coating and the second coating include nitrile-based rubber as a rubber component and further include a crosslinking agent. Furthermore, when the first and second coatings, which include nitrile-based rubber which has high oil resistance, are provided without any other coating interposed therebetween, the overall oil resistance of the coatings is further increased. For these reasons, more satisfactory protection of the reinforcing fiber by the first and second coatings and strong adhesion to matrix rubber can be achieved.

Example of Method for Producing
Rubber-Reinforcing Cord

Hereinafter, an example of the method for producing the rubber-reinforcing cord according to the present embodiment will be described. First, the first coating is formed to cover a reinforcing fiber or a reinforcing fiber bundle. The reinforcing fiber or reinforcing fiber bundle to be prepared is as described above. The first coating can be formed from the first water-based treatment agent including the first rubber and the first crosslinking agent as main components. Specifically, the first water-based treatment agent is applied to the reinforcing fiber or reinforcing fiber bundle and then dried to form the first coating. The first water-based treatment agent includes components for forming the first coating (the first rubber, the first crosslinking agent, and an additive such as a filler which may be added as necessary) and a solvent. The application of the first water-based treatment agent is followed by removal of the solvent, resulting in the formation of the first coating. For example, water is used as the solvent. Thus, a treatment agent prepared by dissolving or dispersing a latex of the first rubber and the first crosslinking agent in water may be used as the first water-based treatment agent. A filler, plasticizer, anti-aging agent, metal oxide, and crosslinking aid may, if desired, be added to the treatment agent to increase the adhesiveness of the coating or improve the stability of the coating.

The method for applying and drying the first water-based treatment agent is not particularly limited. Typically, the reinforcing fiber or reinforcing fiber bundle is immersed in a bath containing the first water-based treatment agent, and then dried in a drying oven to remove the solvent and thus form the first coating. The conditions of the drying for removing the solvent are not particularly limited; however, it is necessary to avoid carrying out the drying under conditions where the reaction of the crosslinking agent in the coating can proceed to completion. It is therefore preferable to shorten the drying time (to 5 minutes or less, for example) when performing the drying at a relatively high temperature (at 80° C. or above, for example). When, for example, the temperature of the atmosphere is 150° C. or below, the drying time may be 5 minutes or less. In an example, the drying may be performed in an atmosphere at 80° C. to 280° C. for 0.1 to 2 minutes.

A plurality of reinforcing fibers or reinforcing fiber bundles each having the first coating formed thereon may be prepared and twisted together. This allows the reinforcing fibers or reinforcing fiber bundles to come into close contact with each other via the first coatings. At this stage, the reaction of the first crosslinking agent has yet to take place, and the first coatings are flexible and in close contact with each other so that the reinforcing fibers or reinforcing fiber bundles can sufficiently strongly adhere to each other.

The second coating is then formed when the second coating is to be provided in contact with the first coating. As described above, the second coating can be formed from the second water-based treatment agent including the second rubber and the second crosslinking agent as main components. Specifically, the second water-based treatment agent is applied onto the first coating and then dried to form the second coating. The second water-based treatment agent includes components for forming the second coating (the second rubber, the second crosslinking agent, and an additive such as a filler which may be added as necessary) and a solvent. The application of the second water-based treatment agent is followed by removal of the solvent, resulting in the formation of the second coating. For example, water is used as the solvent. Thus, a treatment agent prepared by dissolving or dispersing a latex of the second rubber and the second crosslinking agent in water may be used as the second water-based treatment agent. A filler, plasticizer, anti-aging agent, metal oxide, and crosslinking aid may, if desired, be added to the treatment agent to increase the adhesiveness of the coating or improve the stability of the coating.

The method for applying and drying the second water-based treatment agent is not particularly limited. Typically, the reinforcing fiber or reinforcing fiber bundle is immersed in a bath containing the second water-based treatment agent, and then dried in a drying oven to remove the solvent and thus form the second coating. The conditions of the drying for removing the solvent are not particularly limited; however, it is necessary to avoid carrying out the drying under conditions where the reaction of the crosslinking agent in the coating can proceed to completion. It is therefore preferable to shorten the drying time (to 5 minutes or less, for example) when performing the drying at a relatively high temperature (at 80° C. or above, for example). When, for example, the temperature of the atmosphere is 150° C. or below, the drying time may be 5 minutes or less. In an example, the drying may be performed in an atmosphere at 80° C. to 280° C. for 0.1 to 2 minutes.

Another coating can be further formed between the reinforcing fiber or reinforcing fiber bundle and the first coating and/or between the first coating and the second coating.

A heat treatment for inducing crosslinking of the rubber components contained in the first coating and second coating may be performed before or after embedding of the rubber-reinforcing cord in a rubber product.

[Rubber Product]

A rubber product according to the present embodiment will be described. The rubber product according to the present embodiment includes matrix rubber and a rubber-reinforcing cord embedded in the matrix rubber. The rubber-reinforcing cord used is the above rubber-reinforcing cord according to the present embodiment.

The technique for embedding the rubber-reinforcing cord in the matrix rubber of the rubber product is not particularly limited, and a known technique can be employed. When crosslinking of the rubber-reinforcing cord according to the present embodiment is allowed to take place simultaneously with crosslinking of the rubber product, the unity between the rubber-reinforcing cord and the rubber product can be enhanced, and the steps of production of the rubber-reinforcing cord can be simplified. The rubber product thus obtained has high heat resistance attributed to the properties of the matrix rubber and further has high strength and high bending fatigue resistance which result from the embedding of the rubber-reinforcing cord. The rubber product is therefore applicable to various uses and is particularly suitable for use in, for example, a timing belt of a vehicle engine.

The rubber product according to the present embodiment is produced, for example, as follows. First, the rubber-reinforcing cord according to the present embodiment is prepared (any heat treatment that can cause crosslinking involving the crosslinking agents in the coatings to proceed fully should be avoided). Next, the rubber-reinforcing cord is embedded in matrix rubber including rubber and a crosslinking agent. The matrix rubber with the embedded rubber-reinforcing cord is then heat-treated under conditions where the reaction of the crosslinking agents proceed fully, and thus the rubber of each coating of the rubber-reinforcing cord and the matrix rubber of the rubber product are simultaneously crosslinked.

An example of the rubber product according to the present embodiment will be described. FIG. 1 shows an exploded perspective view of a toothed belt 10. The toothed belt 10 includes matrix rubber 11 and rubber-reinforcing cords 12 embedded in the matrix rubber 11. The matrix rubber 11 is composed of rubber or composed of rubber and another material. The rubber-reinforcing cords 12 are each the rubber-reinforcing cord according to the present embodiment, and are arranged parallel to the moving direction of the toothed belt 10. Known products can be used as the parts of the belt other than the rubber-reinforcing cords 12.

EXAMPLES

Hereinafter, the embodiment of the present invention will be described in more detail with Examples and Comparative Examples.

Example 1

<Production of Rubber-Reinforcing Cord>

A glass fiber (reinforcing fiber) constituted by a bundle of 200 glass filaments (composed of E-glass and having an average diameter of 9 µm) was prepared. Three such glass fibers were aligned into a bundle (reinforcing fiber bundle), and a water-based treatment agent (first water-based treatment agent) as shown in Table 1 was applied to the bundle and dried in a drying oven set at 150° C. for 1 minute. A strand was thus formed.

Figure 2:
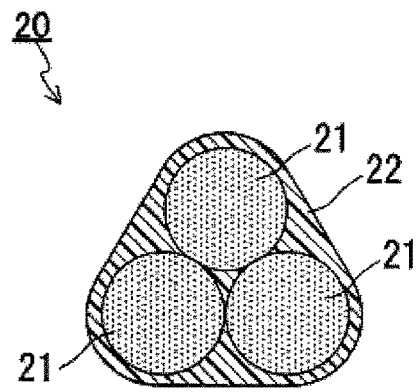
FIG. 2 is a cross-sectional view schematically showing an exemplary reinforcing fiber bundle (strand) included in the rubber-reinforcing cord according to the present invention and having the first coating formed on its surface.

FIG. 2 schematically shows a cross-section of a strand 20 formed as above. Glass fibers 21 are each composed of a large number of filaments. A first coating 22 is formed to cover the surface of the bundle of the three glass fibers 21. The three glass fibers 21 are adhered together by the first coating 22. At this stage, the reaction of the crosslinking agent in the first coating has yet to take place, and the components of the first coating are as shown in Table 1.

The strand obtained as above was primarily twisted at two turns/25 mm. Next, 11 such twisted strands were aligned and finally twisted at two turns/25 mm. The proportion of the coating in the resulting cord was 20 mass %.

Figure 3:
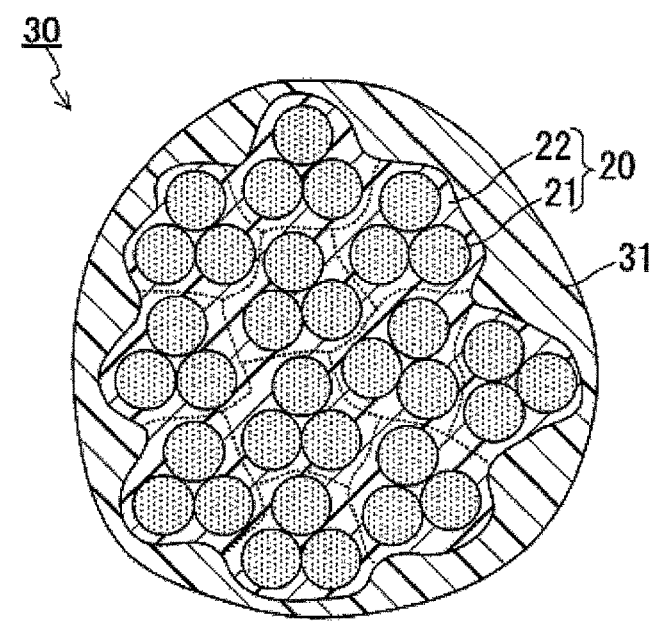
FIG. 3 is a cross-sectional view schematically showing an example of the rubber-reinforcing cord according to the present invention.

A water-based treatment agent (second water-based treatment agent) of Example 1 as shown in Table 2-1 was applied to the cord to form a second coating, which was dried in a drying oven at 150° C. for 1 minute. A rubber-reinforcing cord of Example 1 was thus obtained. FIG. 3 schematically shows a cross-section of a cord 30 thus formed. The strands 20 are adhered to each other by the first coatings 22. A second coating 31 is formed at the surface of the cord 30. At this stage, the reaction of the crosslinking agent in the second coating has yet to take place, and the components of the second coating are as shown in Table 2-1.

The rubber-reinforcing cord of Example 1 obtained as above was subjected to the following evaluation tests.

<Adhesion Strength to Matrix Rubber and Type of Failure>

First, two pieces of rubber composed as shown in Table 3 (each piece having a width of 15 mm, a length of 50 mm, and a thickness of 5 mm) were prepared. Next, the rubber-reinforcing cord was sandwiched by the two rubber pieces in such a manner as to extend parallel to the length of the rubber pieces, and the cord and rubber pieces were adhered together by heating them at 150° C. for 20 minutes. The specimen thus prepared was pulled lengthwise by a tensile tester to measure the peel strength between the matrix rubber and the rubber-reinforcing cord of Example 1. It was also examined whether the failure of the specimen was "rubber failure" which occurred while the rubber-reinforcing cord and the matrix rubber remained adhered, "interfacial peeling" which occurred at the interface between the matrix rubber and the rubber-reinforcing cord, or "spot" which is intermediate between "rubber failure" and "interfacial peeling". Specifically, the "rubber failure" refers to a type of failure in which a crack appears within the matrix rubber without peeling at the interface between the matrix rubber and the rubber-reinforcing cord and in which 90% or more of the surface of the rubber-reinforcing cord is covered by the matrix rubber at the peeling interface. The "spot" refers to a state where 20% or more and less than 90% of the surface of the rubber-reinforcing cord is covered by the matrix rubber at the peeling interface. The "interfacial peeling" refers to a type of failure in which peeling occurs between the matrix rubber and the rubber-reinforcing cord without rubber failure and in which the percentage of broken rubber present at the surface of the peeled rubber-reinforcing cord is less than 20%. The percentage of rubber present at the peeling interface was determined using a printed image of a photograph of the peeling interface. Specifically, first, a photograph of the specimen is taken so as to include the whole peeling interface, a portion corresponding to the whole specimen is cut out from a printed image of the photograph, and the weight W of the cut-out printed image of the whole specimen is measured. Next, a portion corresponding to the rubber is cut out from the printed image of the whole specimen, and the weight w of the whole cut-out portion corresponding to the rubber is measured. Using the measured values of the weights W and w, the percentage of the remaining rubber is determined ((w/W)×100%). The result is shown in Table 2-1.

<Oil Absorbency>

The treatment agent of Example 1 shown in Table 2-1 was poured into a Teflon (registered trademark) mold having a 30 cm×30 cm square cross-section and a depth of 5 mm and was dried at 80° C. for 10 hours (first drying) to obtain a film. This film was subjected to second drying at 120° C. for 150 minutes, and the resulting film was crosslinked at a temperature of 160° C. and a pressure of 100 kg/cm² for 20 minutes. The resulting film was cut to prepare a dumbbell specimen (No. 3 dumbbell specimen as specified in JIS K 6251). This specimen was immersed in an engine oil (Castrol EDGE 5W-30) and allowed to stand in an oven at 120° C. for 24 hours. After that, the film was taken out, then the oil was thoroughly wiped off with a waste cloth, and the change in weight of the film was determined. This weight change was calculated as the oil absorbency by the equation given below. The result is shown in Table 2-1.

Oil absorbency (%)={(Weight after oil immersion)−(Weight before oil immersion)}/(Weight after oil immersion)×100

Examples 2 to 12 and Comparative Examples 1 to 12

<Production of Rubber-Reinforcing Cord>

Rubber-reinforcing cords of Examples 2 to 12 and Comparative Examples 1 to 12 were produced in the same manner as in Example 1, except for applying treatment agents of Examples 2 to 12 shown in Table 2-1 and treatment agents of Comparative Examples 1 to 12 shown in Table 2-2 instead of the treatment agent of Example 1.

<Adhesion Strength to Matrix Rubber and Peeling Interface>

Specimens of Examples 2 to 12 and Comparative Examples 1 to 12 were prepared in the same manner as in Example 1, except for using the rubber-reinforcing cords of Examples 2 to 12 and Comparative Examples 1 to 12 instead of the rubber-reinforcing cord of Example 1. The prepared specimens were tested in the same manner as in Example 1 to evaluate the adhesion strength and peeling interface. The results are shown in Tables 2-1 and 2-2.

<Oil Absorbency>

Specimens of Examples 2 to 12 and Comparative Examples 1 to 12 were prepared in the same manner as in Example 1, except for using the treatment agents of Examples 2 to 12 shown in Table 2-1 and the treatment agents of Comparative Examples 1 to 12 shown in Table 2-2 instead of the treatment agent of Example 1. The prepared specimens were tested in the same manner as in Example 1 to evaluate the oil absorbency. The results are shown in Tables 2-1 and 2-2.

TABLE 1

| Components | Proportions |
| --- | --- |
| H-NBR latex (solid content: 40 mass %) (*1) | 100 parts by mass |
| Aqueous bismaleimide dispersion (solid content: 50 mass %) | 25 parts by mass |
| Carbon black (solid content: 30 mass %) | 35 parts by mass |

(*1) Zetpol Latex (manufactured by Zeon Corporation)

TABLE 2-1

| | | Examples | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| Components of treatment agents (parts by mass of solids) | H-NBR latex (solid content: 40 mass %) (*1) | 100 | | | 50 | | 50 | 100 | | | 100 | 100 | 100 |
| | X-NBR latex (solid content: 40 mass %) (*2) | | 100 | | 50 | 50 | | | 100 | | | | |
| | NBR latex (solid content: 40 mass %) (*3) | | | 100 | | 50 | 50 | | | 100 | | | |
| | Aqueous bismaleimide dispersion (solid content: 50 mass %) | 30 | 30 | 30 | 30 | 30 | 30 | 10 | 10 | 10 | 50 | 50 | 40 |
| | Blocked isocyanate (solid content: 40 mass %) | 25 | 25 | 25 | 25 | 25 | 25 | 10 | 10 | 10 | 40 | 30 | 40 |
| | Carbon black (solid content: 30 mass %) | 10 | 10 | 10 | 10 | 10 | 10 | 2 | 2 | 2 | 10 | 20 | 20 |
| Oil absorbency (%) | | 2.2 | 1.8 | 0.7 | 2.2 | 1.4 | 2.5 | 2.9 | 4.3 | 3.9 | 1.7 | 1.8 | 0.0 |
| Adhesion strength (N/15 mm) | | 233.5 | 215.2 | 222.2 | 234.2 | 228.2 | 258.4 | 188.7 | 154.5 | 204.9 | 275.6 | 185.1 | 183.4 |
| Type of failure | | Rubber failure | Rubber failure | Rubber failure | Rubber failure | Rubber failure | Rubber failure | Rubber failure | Rubber failure | Rubber failure | Rubber failure | Rubber failure | Rubber failure |

(*1) Zetpol Latex (manufactured by Zeon Corporation)
(*2) Nipol 1571H Latex (manufactured by Zeon Corporation)
(*3) Nipol 1562 Latex (manufactured by Zeon Corporation)

TABLE 2-2

| | | Comparative Examples | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| Components of treatment agents (parts by mass of solids) | CSM latex (solid content: 40 mass %) (*4) | 100 | 100 | 100 | | | | | | | | | |
| | SBR latex (solid content: 50 mass %) (*5) | | | | 100 | 100 | 100 | | | | | | |
| | CR latex (solid content: 50 mass %) (*6) | | | | | | | 100 | 100 | 100 | | | |
| | VP latex (solid content: 40 mass %) (*7) | | | | | | | | | | 100 | 100 | 100 |
| | Aqueous bismaleimide dispersion (solid content: 50 mass %) | 30 | 10 | 50 | 30 | 10 | 50 | 30 | 10 | 50 | 30 | 10 | 50 |
| | Blocked isocyanate (solid content: 40 mass %) | 25 | 10 | 40 | 25 | 10 | 40 | 25 | 10 | 40 | 25 | 10 | 40 |
| | Carbon black (solid content: 30 mass %) | 10 | 2 | 20 | 10 | 2 | 20 | 10 | 2 | 20 | 10 | 2 | 20 |
| Oil absorbency (%) | | 30.3 | 35.2 | 18.9 | 13.0 | 31.0 | 7.7 | 5.3 | 5.5 | 5.3 | 30.3 | 35.2 | 35.0 |
| Adhesion strength (N/15 mm) | | 52.3 | 85.8 | 47.0 | 47.5 | 47.1 | 41.1 | 15.3 | 141.1 | 94.6 | 60.1 | 39.7 | 84.5 |
| Type of failure | | Interfacial peeling | Interfacial peeling | Interfacial peeling | Interfacial peeling | Interfacial peeling | Interfacial peeling | Spot | Spot | Spot | Interfacial peeling | Interfacial peeling | Spot |

(*4) SEPOLEX CSM Latex (manufactured by Sumitomo Seika Chemicals Co., Ltd.), CSM: Chlorosulfonated polyethylene
(*5) SB Latex (manufactured by Asahi Kasei Chemicals Corporation), SB: Styrene-butadiene
(*6) CR Latex (manufactured by Denki Kagaku Kogyo K.K.), CR: Chloroprene rubber
(*7) PYRATEX (manufactured by Nippon A & L Inc.), VP: Vinylpyridine-styrene-butadiene

TABLE 3

| Components | Mass ratio |
| --- | --- |
| Hydrogenated nitrile rubber (*1) | 70 |
| Zinc dimethacrylate-containing hydrogenated nitrile rubber (*2) | 30 |
| Zinc oxide | 10 |
| Stearic acid | 1 |
| Carbon black | 30 |
| Trioctyl trimellitate | 5 |
| Sulfur | 0.1 |
| 1,3-bis(t-butylperoxy-isopropyl)benzene | 6 |
| Magnesium oxide | 1 |
| 4,4'-(α,α-dimethylbenzyl)diphenylamine | 0.5 |
| 2-mercaptobenzimidazole zinc salt | 0.5 |
| Triallyl isocyanurate | 1 |

(*1) Zetpol 2020 (manufactured by Zeon Corporation)
(*2) Zetpol 2000L (manufactured by Zeon Corporation)

The rubber-reinforcing cords of Examples 1 to 12, in each of which nitrile-based rubber was used as the rubber composing the second coating located at the outer surface, yielded lower oil absorbency than the rubber-reinforcing cords of Comparative Examples 1 to 12 in which other types of rubber such as CSM were used as the rubber composing the second coatings. Furthermore, the rubber-reinforcing cords of Examples 1 to 12 exhibited stronger adhesion to matrix rubber than the rubber-reinforcing cords of Comparative Examples 1 to 12. These results have confirmed that the rubber-reinforcing cord according to the present invention is capable, even when employed in a rubber product used in an environment involving contact with an oil, of ensuring satisfactory protection of the reinforcing fibers by the coatings and achieving strong adhesion to the matrix rubber of the rubber product.

INDUSTRIAL APPLICABILITY

The present invention is applicable to various rubber products and to rubber-reinforcing cords used in the rubber products. In particular, the present invention can be advantageously embodied as a rubber product used in an environment involving contact with an oil and as a rubber-reinforcing cord employed in such a rubber product.

The invention claimed is:

1. A rubber-reinforcing cord for reinforcing a rubber product, comprising:
    a reinforcing fiber or a reinforcing fiber bundle;
    a first coating provided to cover the reinforcing fiber or the reinforcing fiber bundle; and
    a second coating provided to cover the first coating and be located at an outer surface of the rubber-reinforcing cord,
    wherein the first coating comprises: a first rubber comprising a first nitrile-based rubber as a main component; and a first crosslinking agent,
    the second coating is a coating different from the first coating and comprises: a second rubber consisting essentially of a second nitrile-based rubber; and a second crosslinking agent, or a second rubber consisting essentially of the second nitrile-based rubber; a second crosslinking agent and a filler,
    the first and second nitrile-based rubbers are at least one selected from nitrile rubber, hydrogenated nitrile rubber, carboxylated nitrile rubber, and carboxylated hydrogenated nitrile rubber,
    the second crosslinking agent comprises a maleimide crosslinking agent and an isocyanate compound,
    a content of the maleimide crosslinking agent in the second coating is in a range from 30 parts to 50 parts by mass relative to 100 parts by mass of the second rubber,
    a content of the isocyanate compound in the second coating is in a range from 25 parts to 50 parts by mass relative to 100 parts by mass of the second rubber, and
    a content of the filler in the second coating is in a range of 20 parts or less by mass relative to 100 parts by mass of the second rubber.

2. The rubber-reinforcing cord according to claim 1, wherein the first rubber consists essentially of the first nitrile-based rubber.

3. The rubber-reinforcing cord according to claim 1, wherein the first coating is a coating formed by drying a first water-based treatment agent comprising the first rubber and the first crosslinking agent as main components.

4. The rubber-reinforcing cord according to claim 1, wherein the second coating is a coating formed by drying a second water-based treatment agent comprising the second rubber and the second crosslinking agent as main components.

5. A rubber product reinforced by the rubber-reinforcing cord according to claim 1.

6. The rubber product according to claim 5, being a rubber belt comprising matrix rubber and the rubber-reinforcing cord embedded in the matrix rubber.

7. The rubber-reinforcing cord according to claim 1, wherein the first crosslinking agent comprises a maleimide crosslinking agent.

8. The rubber-reinforcing cord according to claim 1, wherein
    the content of the filler in the second coating is 0 part by mass relative to 100 parts by mass of the second rubber.

* * * * *

UNITED STATES PATENT AND TRADEMARK OFFICE
CERTIFICATE OF CORRECTION

PATENT NO. : 10,913,830 B2
APPLICATION NO. : 15/579822
DATED : February 9, 2021
INVENTOR(S) : Katagiri Page 1 of 1

It is certified that error appears in the above-identified patent and that said Letters Patent is hereby corrected as shown below:

On the Title Page

Page 2, Item (56), Column 2, under "Foreign Patent Documents", delete "WO 2015098105 7/2015".

In the Claims

Claim 1, Column 16, Line 9: after "agent", insert --;--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*